US012786823B2

United States Patent
(12) United States Patent
Khosravirad et al.

(10) Patent No.: US 12,786,823 B2
(45) Date of Patent: Nov. 3, 2026

(54) HANDOVER OF SUBNETWORK

(71) Applicant: Nokia Technologies Oy, Espoo (FI)

(72) Inventors: Saeed Reza Khosravirad, Mountainside, NJ (US); Dong Li, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 211 days.

(21) Appl. No.: 18/894,447

(22) Filed: Sep. 24, 2024

(65) Prior Publication Data

US 2025/0106711 A1 Mar. 27, 2025

Related U.S. Application Data

(63) Continuation of application No. PCT/CN2023/121281, filed on Sep. 25, 2023.

(51) Int. Cl.
*H04W 36/00* (2009.01)
*H04W 36/14* (2009.01)

(52) U.S. Cl.
CPC ....... *H04W 36/0085* (2018.08); *H04W 36/14* (2013.01)

(58) Field of Classification Search
CPC ............. H04W 36/0085; H04W 36/14; H04W 72/0453; H04W 36/083
See application file for complete search history.

(56) References Cited

U.S. PATENT DOCUMENTS 11,812,314 B2 * 11/2023 Yang ...................... H04L 1/0017
2016/0057684 A1 * 2/2016 Larsson ................ H04W 24/02 370/331
2018/0183551 A1 * 6/2018 Chou ...................... H04L 5/001
2020/0067661 A1 * 2/2020 Siomina ................ G01S 5/0036
2020/0259627 A1 * 8/2020 Loehr ................... H04L 5/0098

FOREIGN PATENT DOCUMENTS

WO 2015/133749 A1 9/2015
WO 2020/164355 A1 8/2020
WO 2022/151400 A1 7/2022
WO 2024/036451 A1 2/2024
(Continued)

OTHER PUBLICATIONS

Berardinelli et al., "Extreme Communication in 6G: Vision and Challenges for 'in-X' Subnetworks", IEEE Open Journal of the Communications Society, vol. 02, Oct. 26, 2021, pp. 2516-2535.
(Continued)

*Primary Examiner* — Dhaval V Patel
(74) *Attorney, Agent, or Firm* — Barta Jones, PLLC

(57) ABSTRACT

Example embodiments of the present disclosure relate to handover of subnetworks. The first apparatus determines that a first subnetwork is triggered to handover from a first cell to a second cell, the first apparatus being in the first subnetwork; based on the triggering, communicates with at least one other apparatus in the first subnetwork by using a first frequency resource; receives, from a second apparatus providing the second cell, resource configuration indicating a second frequency resource to be used in the first subnetwork instead of the first frequency resource; and communicates with the at least one other apparatus by using the second frequency resource indicated in the resource configuration.

20 Claims, 12 Drawing Sheets

(56) References Cited

FOREIGN PATENT DOCUMENTS

| | | | |
|---|---|---|---|
| WO | 2024/044896 | A1 | 3/2024 |
| WO | 2024/119316 | A1 | 6/2024 |
| WO | 2024/152170 | A1 | 7/2024 |

OTHER PUBLICATIONS

Lee et al., "Enhanced Group Handover Scheme in Multiaccess Networks", IEEE Transactions on Vehicular Technology, vol. 60, No. 05, May 2, 2011, pp. 2389-2395.

Cai et al., "Network Selection for Group Handover in Multi-Access Networks", IEEE International Conference on Communications, May 19-23, 2008, pp. 2164-2168.

"3rd Generation Partnership Project; Technical Specification Group Radio Access Network; Study on further enhancements to LTE Device to Device (D2D), User Equipment (UE) to network relays for Internet of Things (IoT) and wearables; (Release 15)", 3GPP TR 36.746 V15.1.1, Apr. 2018, pp. 1-55.

"IEEE 802.11", Wikipedia, Retrieved on Jul. 15, 2025, Webpage available at: https://en.wikipedia.org/wiki/IEEE_802.11.

International Search Report and Written Opinion received for corresponding Patent Cooperation Treaty Application No. PCT/CN2023/121281, dated Apr. 3, 2024, 14 pages.

* cited by examiner

T2:EXAMPLE TIMING OF A HO OPERATION, WHICH DOESN’T COINCIDE WITH THE IMM COLLECTION AND SUBBAND ALLOCATION

THE RESOURCE ALLOCATION PERIOD MAY OR MAY NOT BE SYNCHRONIZED AMONG BSS

T0, T1, T2: INTERFERENCE MEASUREMENTS OF THE SUBNETWORKS IS SHARED WITH OVERLAY BS(IMM) AND CENTRAL SUBBAND ALLOCATION TO THE SUBNETWORKS HAPPENS AT THESE POINTS

HANDOVER OF SUBNETWORK

FIELDS

Various example embodiments of the present disclosure generally relate to the field of telecommunication and in particular, to methods, devices, apparatuses and computer readable storage medium for handover of subnetworks.

BACKGROUND

The In-X subnetwork (hereinafter may also be referred to as subnetwork or sub-network) has been proposed as a promising component to satisfy the extreme performance requirements in terms of latency, reliability and/or throughput envisioned for some short-range scenarios in 6th Generation (6G) radio access technology. For example, the subnetworks may be installed in specific entities e.g., in-production module, in-vehicle, in-body, in-house, etc., to provide life-critical data service with extreme performances over the local capillary coverage.

SUMMARY

In a first aspect of the present disclosure, there is provided a first apparatus. The first apparatus comprises at least one processor; and at least one memory storing instructions that, when executed by the at least one processor, cause the first apparatus at least to: determine that a first subnetwork is triggered to handover (HO) from a first cell to a second cell, the first apparatus being in the first subnetwork; based on the triggering, communicate with at least one other apparatus in the first subnetwork by using a first frequency resource; receive, from a second apparatus providing the second cell, resource configuration indicating a second frequency resource to be used in the first subnetwork instead of the first frequency resource; and communicate with the at least one other apparatus by using the second frequency resource indicated in the resource configuration.

In a second aspect of the present disclosure, there is provided a second apparatus. The second apparatus comprises at least one processor; and at least one memory storing instructions that, when executed by the at least one processor, cause the second apparatus at least to: receive, from a first apparatus in a first subnetwork, first interference information among the first subnetwork and at least one second subnetwork in a second cell provided by the second apparatus; receive, from the first apparatus or a third apparatus providing a first cell, second interference information among the first subnetwork and at least one third subnetwork in the first cell; determine, based on the first and second interference information, a second frequency resource to be used in the first subnetwork; and transmit, to the first apparatus, a resource configuration indicating the second frequency resource, wherein the first subnetwork is triggered to switch from the first cell to the second cell.

In a third aspect of the present disclosure, there is provided a third apparatus. The third apparatus comprises at least one processor; and at least one memory storing instructions that, when executed by the at least one processor, cause the third apparatus at least to: receive, from a second apparatus, a message comprising information used by the first apparatus to determine a first frequency resource; and transmit the message to the first apparatus, wherein the first subnetwork is triggered to switch from a first cell provided by the third apparatus to a second cell provided by the second apparatus.

In a fourth aspect of the present disclosure, there is provided a method. The method comprises: determining that a first subnetwork is triggered to handover from a first cell to a second cell, the first apparatus being in the first subnetwork; based on the triggering, communicating with at least one other apparatus in the first subnetwork by using a first frequency resource; receiving, from a second apparatus providing the second cell, resource configuration indicating a second frequency resource to be used in the first subnetwork instead of the first frequency resource; and communicating with the at least one other apparatus by using the second frequency resource indicated in the resource configuration.

In a fifth aspect of the present disclosure, there is provided a method. The method comprises: receiving, from a first apparatus in a first subnetwork, first interference information among the first subnetwork and at least one second subnetwork in a second cell provided by the second apparatus; receiving, from the first apparatus or a third apparatus providing a first cell, second interference information among the first subnetwork and at least one third subnetwork in the first cell; determining, based on the first and second interference information, a second frequency resource to be used in the first subnetwork; and transmitting, to the first apparatus, a resource configuration indicating the second frequency resource, wherein the first subnetwork is triggered to switch from the first cell to the second cell.

In a sixth aspect of the present disclosure, there is provided a method. The method comprises: receiving, from a second apparatus, a message comprising information used by the first apparatus to determine a first frequency resource; and transmitting the message to the first apparatus, wherein the first subnetwork is triggered to switch from a first cell provided by the third apparatus to a second cell provided by the second apparatus.

In a seventh aspect of the present disclosure, there is provided a first apparatus. The first apparatus comprises means for determining that a first subnetwork is triggered to handover from a first cell to a second cell, the first apparatus being in the first subnetwork; means for based on the triggering, communicating with at least one other apparatus in the first subnetwork by using a first frequency resource; means for receiving, from a second apparatus providing the second cell, resource configuration indicating a second frequency resource to be used in the first subnetwork instead of the first frequency resource; and means for communicating with the at least one other apparatus by using the second frequency resource indicated in the resource configuration.

In an eighth aspect of the present disclosure, there is provided a second apparatus. The second apparatus comprises means for receiving, from a first apparatus in a first subnetwork, first interference information among the first subnetwork and at least one second subnetwork in a second cell provided by the second apparatus; means for receiving, from the first apparatus or a third apparatus providing a first cell, second interference information among the first subnetwork and at least one third subnetwork in the first cell; means for determining, based on the first and second interference information, a second frequency resource to be used in the first subnetwork; and means for transmitting, to the first apparatus, a resource configuration indicating the second frequency resource, wherein the first subnetwork is triggered to switch from the first cell to the second cell.

In a ninth aspect of the present disclosure, there is provided a third apparatus. The third apparatus comprises means for receiving, from a second apparatus, a message comprising information used by the first apparatus to determine a first frequency resource; and means for transmitting the message to the first apparatus, wherein the first subnetwork is triggered to switch from a first cell provided by the third apparatus to a second cell provided by the second apparatus.

In a tenth aspect of the present disclosure, there is provided a computer readable medium. The computer readable medium comprises instructions stored thereon for causing an apparatus to perform at least the method according to the fourth aspect.

In an eleventh aspect of the present disclosure, there is provided a computer readable medium. The computer readable medium comprises instructions stored thereon for causing an apparatus to perform at least the method according to the fifth aspect.

In a twelfth aspect of the present disclosure, there is provided a computer readable medium. The computer readable medium comprises instructions stored thereon for causing an apparatus to perform at least the method according to the sixth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
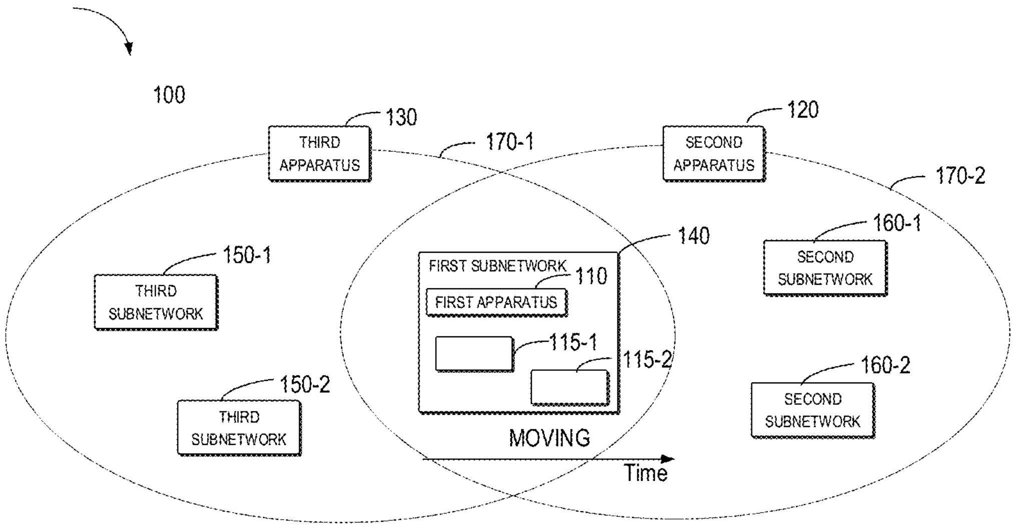
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like.

As described above, 6G radio access technology may expect extreme high requirements in terms of latency, reliability and/or throughput and the In-X subnetwork (i.e., subnetwork) may be considered as a promising component of 6G network to meet these extreme performance requirements.

In addition to support the extreme performance requirements, the subnetworks may be implemented with low transmit power which leads to the limited coverage. For a subnetwork, a star or tree topology may be implemented with one in-X subnetwork AP and one or more in-X subnetwork UEs under the AP's control. There is limited mobility for the subnetwork UEs across different subnetworks. A subnetwork may be part of overlay Wide Area Network (WAN) network but shall continue to work also when out of network coverage.

For example, typical in-X subnetwork use cases may comprise in-robot/in-production module subnetworks and in-vehicle subnetworks with extreme performance requirements in both reliability (up to 6 nines or more) and latency (down to the level of 100 us or even below) e.g., for the high demanding periodic deterministic communication services and these use cases may be the most challenging scenarios in 6G system.

Generally speaking, the handover procedure is an essential process of current cellular technologies. Further, handover of a subnetwork in general follows the same protocols as in user handover. However, there are critical differences in the sense. For example, the handover is effectively not only for the subnetwork AP but also effects the group of UEs in that subnetwork, and further, the resource allocation to the subnetwork is affected by the handover differently from typical UE handover in cellular technologies.

As used herein, HO stands for handover; HO AP stands for the AP of the subnetwork that is subject to handover; departure (Dep.) BS stands for the overlay cell BS that HO AP is leaving, and Host BS stands for the destination cell BS; a subband stands for a segment of the carrier bandwidth, and refers to the smallest chunk of bandwidth that is allocated to a subnetwork.

In the present discourse, terms of "first cell/based station", "source cell/based station", "departure cell/based station" may be used interchangeably; terms of "second cell/based station", "target cell/based station", "host cell/based station" may be used interchangeably.

For ease of discussion, some terms used in the following description are listed as below:

First frequency resource: refer to a temporary frequency resource, e.g., a subband, used in a subnetwork when the subnetwork is triggered to handover from a first cell to a second cell. In view of this, terms of "first frequency resource" and "temporary frequency resource" may be used interchangeably.

Second frequency resource: refer to a frequency resource, e.g., a subband, allocated by a network device (such, a target network device) and to be used in a subnetwork. In view of this, terms of "second frequency resource", "configured frequency resource" and "allocated frequency resource" may be used interchangeably. Be intended to replace or to be used after the first frequency resource.

The interference measurement matrix (IMM) denotes a holistic inter-subnetwork interference measure which is constructed by the overlay BS based on the inter-subnetwork interference periodically reported from all the relevant sub-network APs. Here the inter-subnetwork interference reported from a subnetwork AP may be the summed weighted interference (e.g., interference-to-signal power ratio, ISR) measured by the subnetwork devices for the interference from each of the interfering subnetwork. It may also refer to the inverse of that measure, i.e., signal to interference power ratio (SIR). The implementation details of the IMM is not limited in this present disclosure.

Further, one of the "first frequency resource" and "second frequency resource" may be referred to as "a frequency resource" and the other one of the "first frequency resource" and "second frequency resource" may be referred to as "a further frequency resource".

Principles and implementations of the present disclosure will be described in detail below with reference to the figures.

Example Environment

FIG. 1 illustrates an example communication environment 100 in which example embodiments of the present disclosure can be implemented. The communication environment 100 includes a first apparatus 110 within a first subnetwork 140. In addition to the first apparatus 110, the first subnetwork 140 also may comprise other apparatuses 115-1 and 115-2. In FIG. 1, the first apparatus 110 may be an access point (AP), while the other apparatuses 115-1 and 115-2 may be terminal devices.

As illustrated in FIG. 1, the communication environment 100 also comprises a second apparatus 120 and a third apparatus 130. Further, a serving area provided by the second apparatus 120/third apparatus 130 is called a cell. The second apparatus 120/third apparatus 130 can provide one or more cells, for example, a first cell 170-1 is provided by the third apparatus 130, while a second cell 170-2 is provided by the second apparatus 120.

In FIG. 1, the third subnetworks 150-1, 150-2 and the first subnetwork 140 are within the first cell 170-1, and second subnetworks 160-1, 160-2 and the first subnetwork 140 are within the second cell 170-2.

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Work Principle and Example Signaling for Communication

According to some example embodiments of the present disclosure, there is provided a solution for subnetwork handover. It is to be clarified that the solution discussed herein may be applicable to any wireless network in a cellular technology with subnetwork-like architecture where low-latency communications is required as part of the service.

The solution may be especially implemented in a scenario where a subnetwork (i.e., the subnetwork AP, also called as HO AP and/or the connected devices) is triggered to switch from one overlay BS (called as departure BS sometimes), to another overlay BS (called as Host BS sometimes). The examples are divers and may include in-body or in-vehicle subnetworks with mobility being handed off among cells.

Figure 2A:
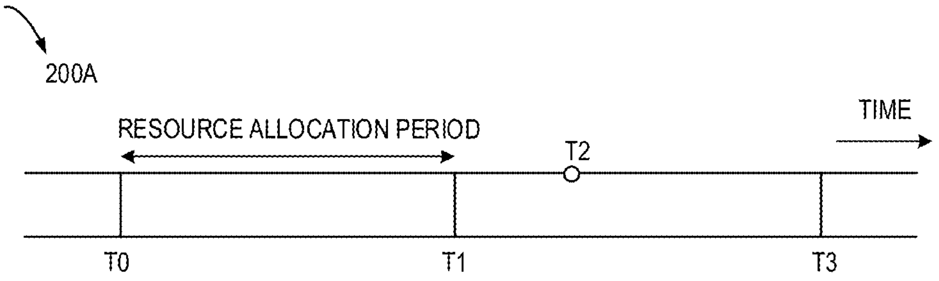
FIG. 2A illustrates an example timing of the subband allocation periods and handover operation.

Refer to FIG. 2A (which illustrates an example timing 200A of the subband allocation periods and handover operation). In FIG. 2A, the first apparatus 110 (such as, HO AP) and its connected UEs are affected by both the interference from host BS area (i.e., the second cell 170-2) and the interference from departure BS area (i.e., the first cell 170-1), and therefore require additional consideration for handover and subband allocation during and after handover process.

Generally speaking, the subband allocated by departure BS to HO AP prior to HO, may experience interference by other subnetworks in the Host BS coverage area too (and vice versa). This situation is very likely given that the subband allocation to subnetworks is not coordinated among BSs, but additionally, some allocations follow distributed subband allocation.

The applications served by the subnetwork are mission critical and cannot be strongly interfered, otherwise, service interruption in the form of lack of such as reliability, increased latency, service unavailability may be experienced.

Below example embodiments may reduce/remove chance of excess interference duration and after HO operation.

In summary, as illustrated in 2B (which illustrates example operation phase 200B), the solution discussed herein considers the fact that HO AP and devices connected to it are affected by interference from both the subnetworks in Host BS cell and the subnetworks in the departure BS cell. Therefore, a two-phase solution is proposed, where in the first phase, HO AP is assisted with choice of a temporary subband. The temporary subband is used by the HO AP during the HO operation and until the next interference measurement and subband allocation instance in the Host BS cell starts. During the second phase, the Host BS triggers interference measurement for the HO AP and a selected group of subnetworks in the Host BS cell and allocates subband to HO AP considering the result of that interference measurement and the interference that is affecting HO AP from the departure BS cell subnetworks.

Figure 3:
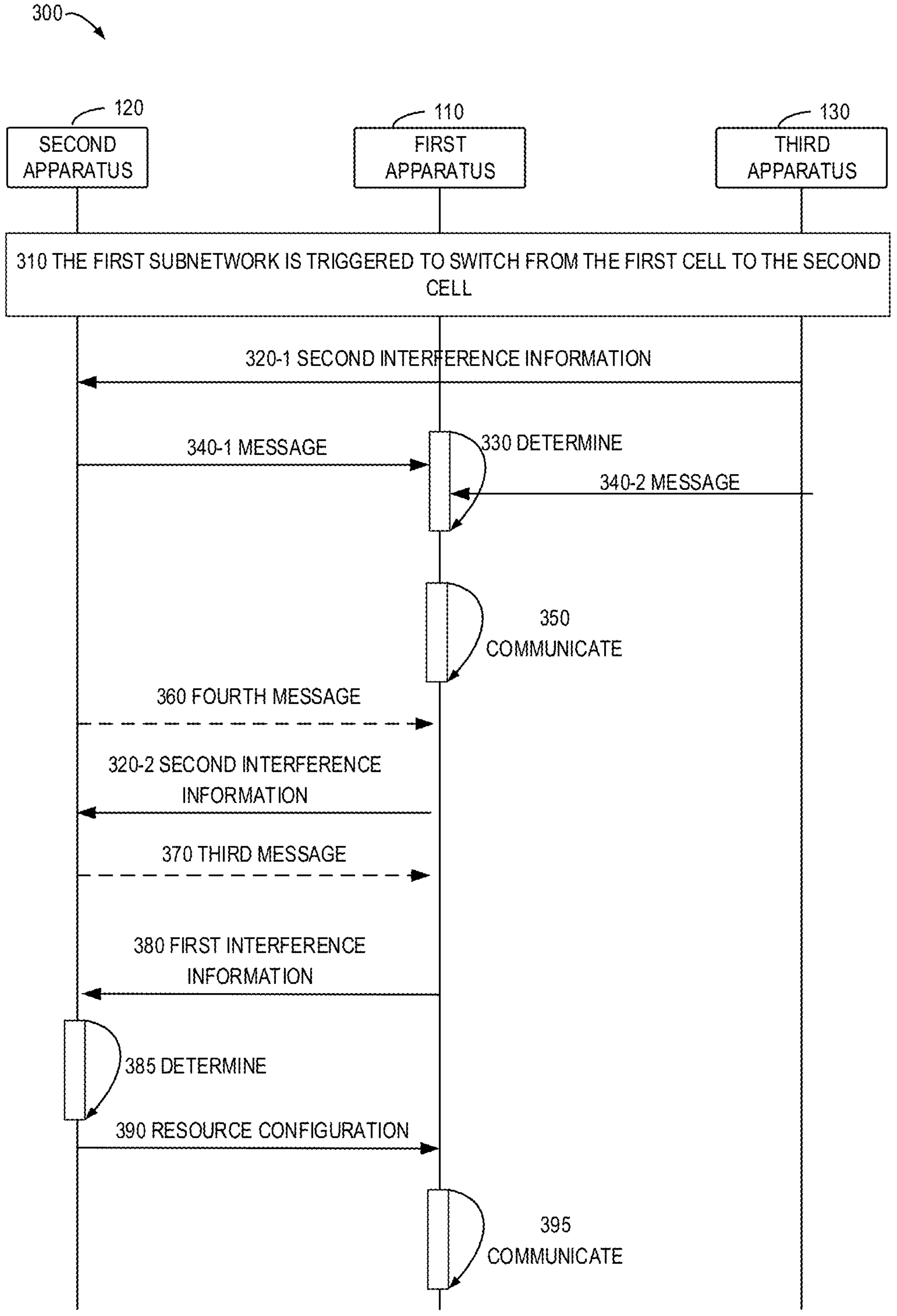
FIG. 3 illustrates a signaling flow of communication in accordance with some embodiments of the present disclosure.

Reference is made to FIG. 3, which illustrates a signaling flow 300 of communication in accordance with some embodiments of the present disclosure. For the purposes of discussion, the signaling flow 300 will be discussed with reference to FIG. 1, for example, by using the first apparatus 110, the second apparatus 120 and the third apparatus 130.

In the following, although some operations are described from a perspective of the first apparatus 110, it is to be understood that the corresponding operations should be performed by the second apparatus 120/the third apparatus 130. Similarly, although some operations are described from a perspective of the second apparatus 120, it is to be understood that the corresponding operations should be performed by the first apparatus 110/the third apparatus 130, and although some operations are described from a perspective of the third apparatus 130, it is to be understood that the corresponding operations should be performed by the first apparatus 110/the second apparatus 120. Merely for brevity, some of the same or similar contents are omitted here.

In the example of FIG. 3, the first apparatus 110 may be an access point, the second apparatus 120 and third apparatus 130 may be base stations. Additionally, the base station may be responsible for allocating frequency resources (such as, subband resource) for the subnetworks within the coverage of the base station. For example, transmit a resource configuration to an access point within a subnetwork, which may indicate a frequency resource to be used in the subnetwork. In this way, the resource allocation may be centrally controlled.

In FIG. 3, the first frequency resource and the second frequency resource may be a subband resource.

In operation, a first subnetwork 140 is triggered 310 to handover from a first cell 170-1 to a second cell 170-2, where the first apparatus 110 is in the first subnetwork 140.

Based on the triggering, the first apparatus 110 communicates 350 with at least one other apparatus 115 in the first subnetwork 140 by using a first frequency resource.

In the following, the first apparatus 110 receives 390 from a second apparatus 120 providing the second cell 170-2, resource configuration indicating a second frequency resource to be used in the first subnetwork 140 instead of the first frequency resource, and then communicate 395 with the at least one other apparatus by using the second frequency resource indicated in the resource configuration.

Next, how to determine the first frequency resource will be discussed.

In some example embodiments, the first apparatus 110 may receive 340-2 from a third apparatus 130 (or may receive 340-1 from the second apparatus 120), a first message indicating the first frequency resource. Then, the first apparatus 110 may determine 330 the first frequency resource based on the first message.

Alternatively, in some example embodiments, the first apparatus 110 may perform interference measurements on a plurality of frequency resources, and then may determine, based on interference measurement results, the first frequency resource from the plurality of frequency resources. Additionally, in some example embodiments, prior to performing the interference measurements, the first apparatus 110 may receive 340-2 from a third apparatus 130 (or may receive 340-1 from the second apparatus 120), a second message indicating the plurality of frequency resources.

In some example embodiments, the second message may further indicate a plurality of priority values corresponding to the plurality of frequency resources. As a result, the first apparatus 110 may determine the first frequency resource further based on the plurality of priority values.

In the following, how to determine the second frequency resource will be discussed.

As illustrated in FIG. 3, in operation, the second apparatus 120 receives 380, from a first apparatus 110 in a first subnetwork 140, first interference information among the first subnetwork 140 and at least one second subnetwork 160 in a second cell 170-2 provided by the second apparatus 120.

In addition to the first interference information, the second apparatus 120 may also receive second interference information among the first subnetwork 140 and at least one third subnetwork 150 in the first cell 170-1. In one example embodiments, the second interference information may be received 320-1 from the third apparatus 130, Alternatively, in some embodiments, the second interference information may be received 320-2 from the first apparatus 110.

Then, based on the first and second interference information, the second apparatus 120 determines 385 the second frequency resource, and transmits 390 the resource configuration indicating the second frequency resource to the first apparatus 110.

In some example embodiments, prior to receiving the first interference information, the second apparatus 120 may transmit 370, to the first apparatus 110, a third message used for indicating the first apparatus 110 to perform interference measurements to determine the first interference information.

In some example embodiments, prior to receiving the second interference information, the second apparatus 120 may transmit 360, to the first apparatus 110, a fourth message used for configuring a resource to be used by the first apparatus 110 for transmitting the second interference information.

Embodiments

Merely for better understanding the processes discussed herein, some example embodiments are discussed with reference to FIG. 4A to FIG. 8. For the purposes of discussion, FIG. 4A to FIG. 8 will be discussed with reference to FIG. 1, for example, by using the first apparatus 110 (such as, an HO AP), the second apparatus 120 (such as, a host BS) and the third apparatus 130 (such as, a Dep. BS).

In some example embodiments, a temporary subband may be allocated for a first subnetwork during a handover procedure of the first subnetwork. Specifically, since the IMM information for the second apparatus 120 does not include the first apparatus 110, a temporary subband may be allocated to the first subnetwork.

In some example embodiments, the temporary allocation signaling may be conveyed over 'temp subband allocation'. In some example embodiments, the temporary subband may be valid until the next IMM measurement incident.

In some example embodiments, the temporary subband may be determined by the second apparatus 120 by monitoring its own IMM. For example, the second apparatus 120 may select a subband(s) that is not in use by any of the other subnetworks in the second cell 170-2. In case of no such vacant subband, the second apparatus 120 may select a subband that is least likely to be interfered.

In some example embodiments, the first apparatus 110 may perform carrier sensing and select a subband with smallest interference level upon receiving handover message (which trigger the first subnetwork to switch to the second cell 170-2), which is suitable for the distributed resource allocation scenarios.

Reference is now made to FIG. 4, which illustrates an example block 400 for determining the temporary subband.

In some example embodiments, a short list of potential subbands may be created by the second apparatus 120. For example, the second apparatus 120 may select a list of subbands that are not in use by any of the other subnetworks in the second cell 170-2. In case of no such vacant subband, the second apparatus 120 may select a list of subbands that are least likely to be interfered. The second apparatus 120 may send over 'temporary subband allocation' indicating the short list of potential subbands to the first apparatus 110. Then, the first apparatus 110 may perform carrier sensing to choose the temporary subband from the short list.

In some example embodiments, the temporary subband may also be selected by the departure BS, or the information (i.e., the temporary subband or a short list of potential subbands) originated from the second apparatus 120 may be communicated to the first apparatus 110 through departure BS.

In some example embodiments, the departure BS, i.e., the third apparatus, may send HO request to the second apparatus 120, the second apparatus 120 makes admission control and HO preparation, departure BS sends HO command to HO AP, then the first apparatus 110 makes access procedure to the second apparatus 120 to establish connection. Finally, the first apparatus 110 sends HO complete to the second apparatus 120.

Figure 4A:
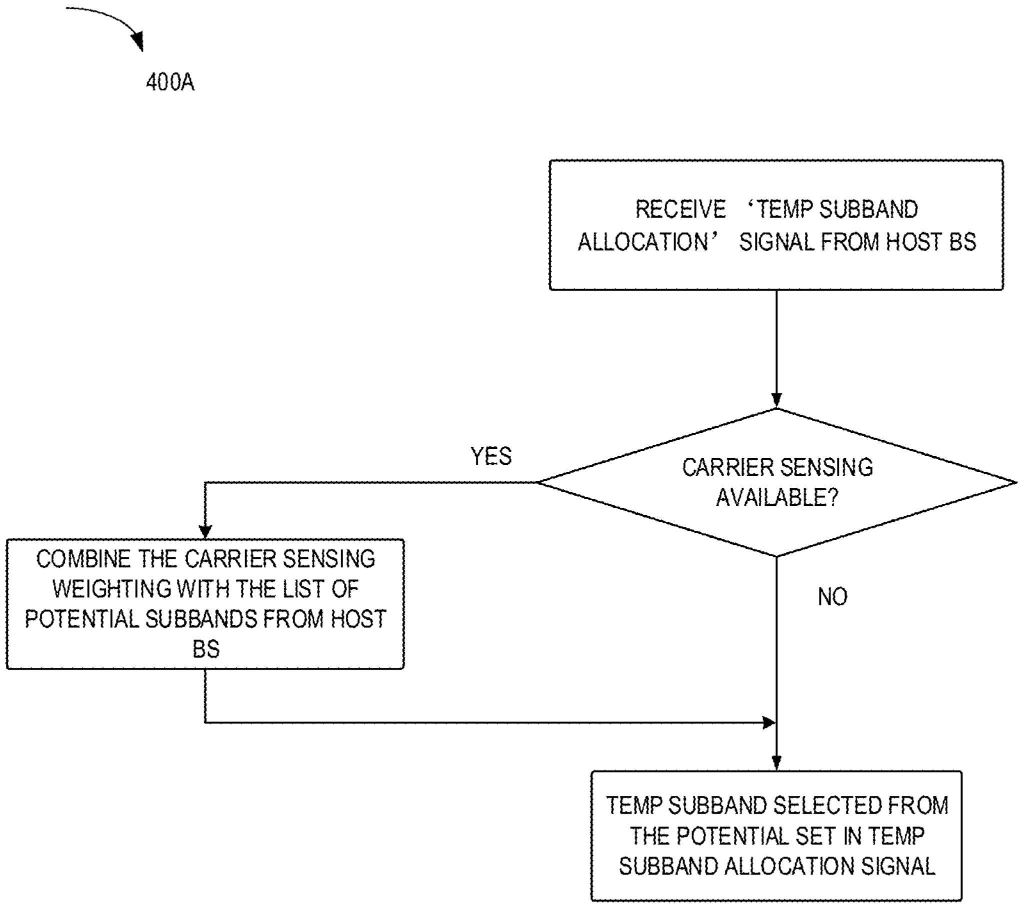
FIG. 4A illustrates a signaling flow of communication in accordance with some embodiments of the present disclosure.
Figure 4B:
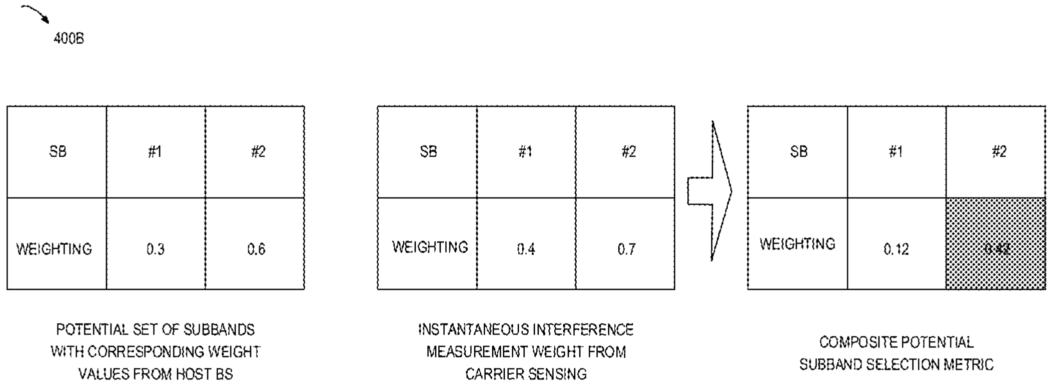
FIG. 4B illustrates an example block for determining temporary subband.

Example operation at the first apparatus 110 for determining the temporary subband is illustrated FIG. 4B, which illustrates an example block 400B for determining temporary subband.

In FIG. 4B, potential set of subbands may be received over the 'temporary subband allocation' signal from the second apparatus 120. Further, in some example embodiments, the potential set includes weighting for each subband demonstrating the priority (e.g., likelihood of being interfered, or the normalized level of expected signal to expected interference power ratio).

Further, the instantaneous carrier sensing result from the first apparatus 110 may be used in form of weighting values (e.g., in terms of normalized interference level sensed, or normalized level of expected signal to expected interference power ratio). As a result, the two weightings are combined to create the composite subband metric.

In the following, a procedure of IMM update for the second apparatus 120 will be discussed as below. In some example embodiments, this procedure may be implemented based on pre-configured cycles or is triggered on-demand by the second apparatus 120.

In some example embodiments, the first apparatus 110 receives instructions from the second apparatus 120 to perform pilot transmission and interference measurement for IMM update, which may happen at the periodic IMM measurement instance of the second apparatus 120, or triggered on-demand.

Figure 5:
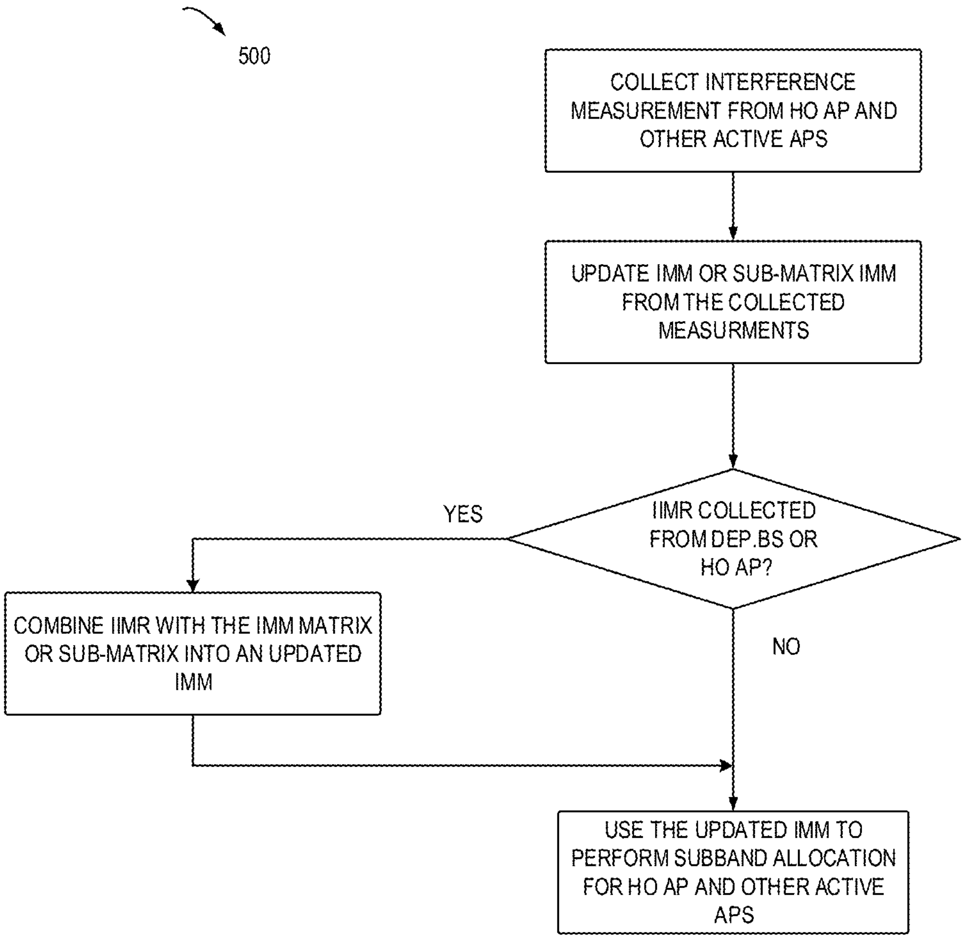
FIG. 5 illustrates a signaling flow of communication in accordance with some embodiments of the present disclosure.

Additionally, the first apparatus 110 may report back its measurements as illustrated in FIG. 5, which illustrates a signaling flow 500 of communication in accordance with some embodiments of the present disclosure.

Figure 6:
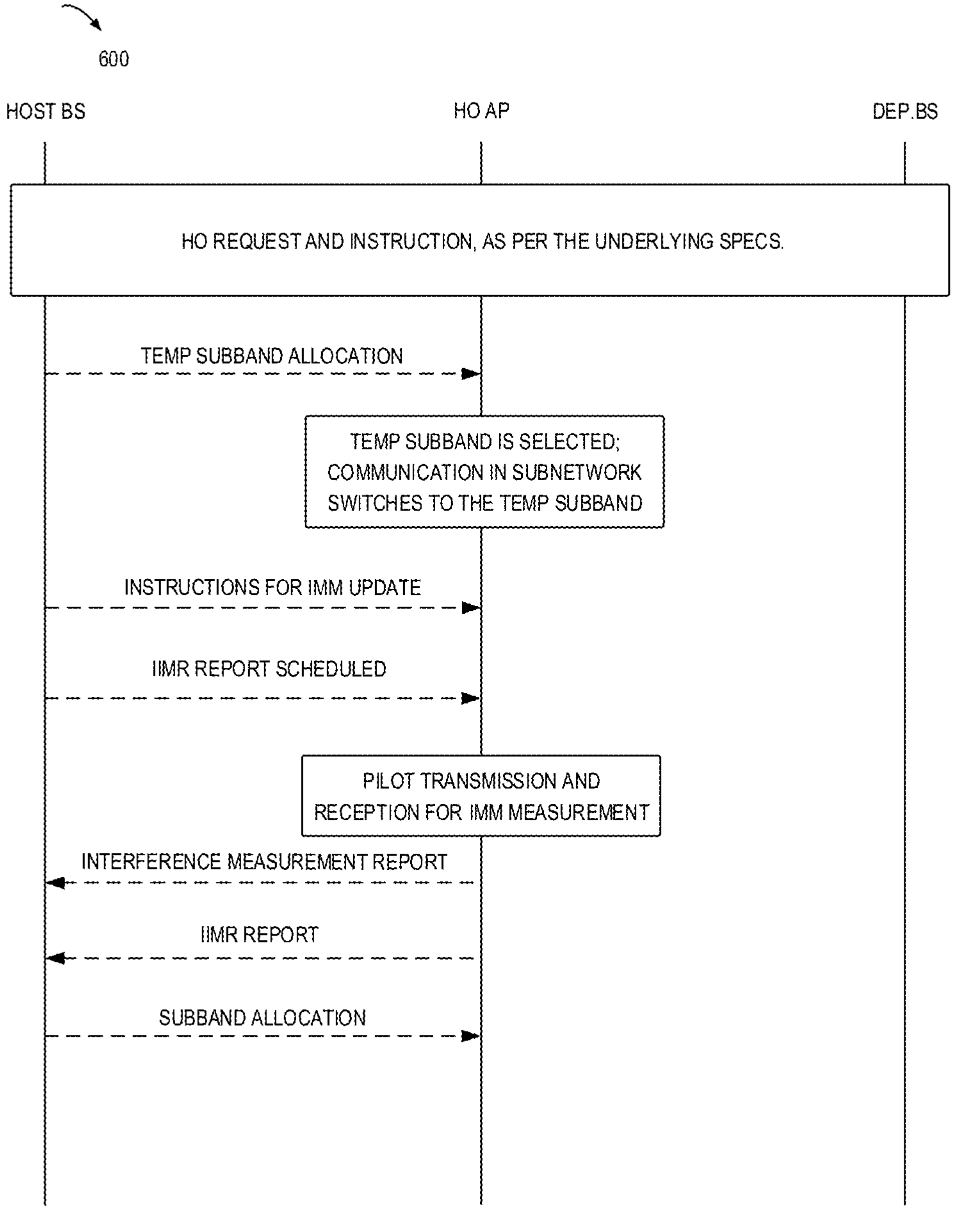
FIG. 6 illustrates a signaling flow of communication in accordance with some embodiments of the present disclosure.

In some example embodiments, a special signaling opportunity is scheduled for the first apparatus 110, called 'incumbent interference measurement report' (IIMR), where it reports its IMM measurements from the last measurement incidence in departure BS cell. Refer to FIG. 6, which illustrates a signaling flow 600 of communication in accordance with some embodiments of the present disclosure. In FIG. 6, the first apparatus 110 (i.e. HO AP) transmits the IIMR to the host BS.

In one example embodiment, a sub-matrix update of the IMM may be performed instead of the full IMM update. E.g., the second apparatus 120 triggers a sub-matrix IMM update by following:

- choosing a subset of the subbands;
- creating a sub-matrix IMM for those subbands and the subnetworks that are active subnetworks in those subbands;
- triggering pilot transmission and interference measurement for the selected subnetworks and the first apparatus 110 subnetwork, to update a sub-matrix IMM.

Figure 7:
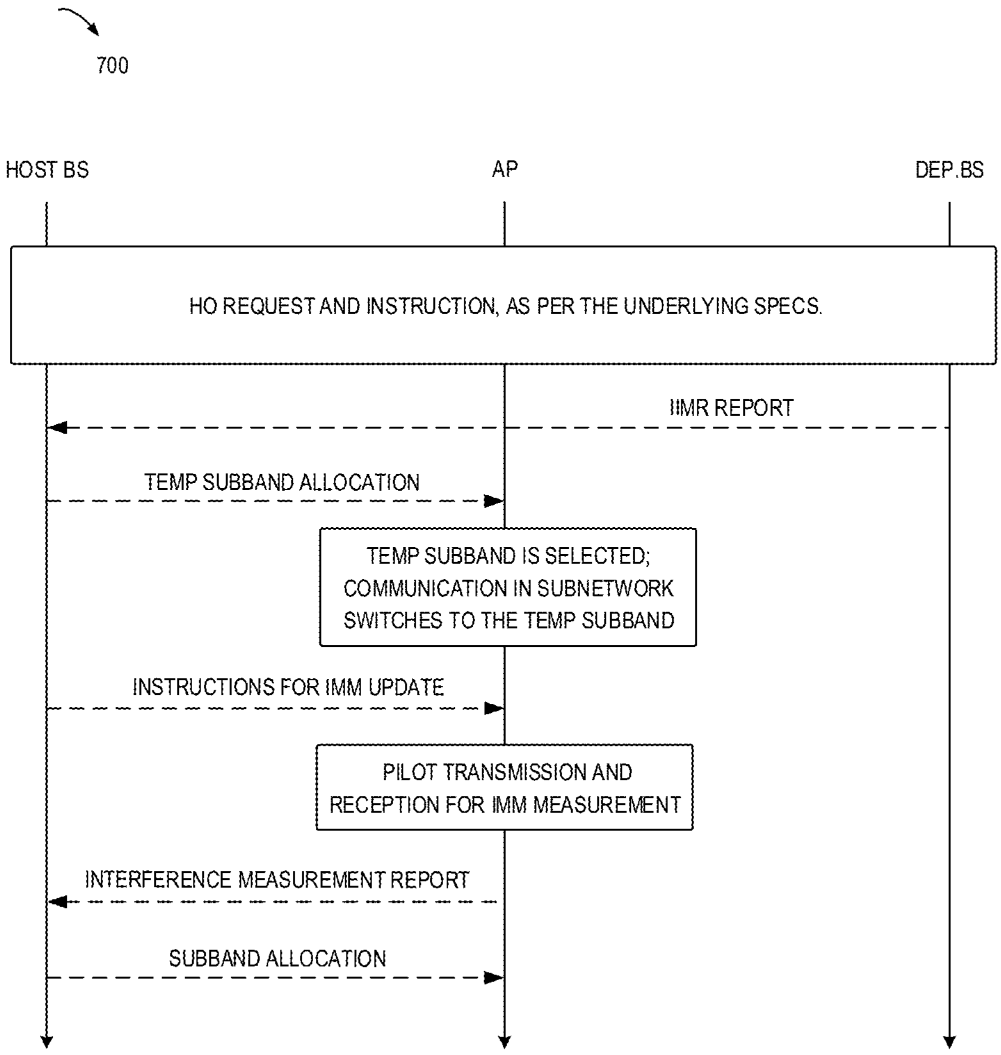
FIG. 7 illustrates a signaling flow of communication in accordance with some embodiments of the present disclosure.

Alternatively, in some example embodiments, the departure BS sends its IMM to the second apparatus 120 which will be used as the IIMR (as illustrated in FIG. 7, illustrates a signaling flow 700 of communication in accordance with some embodiments of the present disclosure).

In the present disclosure, different embodiments of the IIMR report can be considered.

In some example embodiments, the report includes the actual interference measurements: this measurement can be done during a resource allocation cycle shown in FIG. 2A, by the first apparatus 110. This measurement can also be estimated by the Dep. AP, e.g., at the beginning of a resource allocation cycle, the BS allocates subbands to subnetworks according to the IMM. By performing the allocation, the BS can also estimate according to the IMM, what will be the interference received by each subnetwork over each subband.

In some example embodiments, the report includes the expected interference according to IMM only. Note that the IMM includes the expected interference between each two subnetworks over each subband. Therefore, without the knowledge of allocated subbands, one cannot know the actual interference each subnetwork will experience over each subband. However, the IMM can be used to predict the expected interference for the first apparatus 110 over each subband.

Then, the subband allocation to the first apparatus 110 and finalizing coordination of the subnetwork may be performed.

In some example embodiments, the second apparatus 120 collects measurement from its subnetwork APs including the first apparatus 110; the second apparatus 120 also collects IIMR from the first apparatus 110 (or departure BS).

In some example embodiments, the second apparatus 120 performs subnetwork assignment for all APs (or subset of APs) using the updated IMM (or sub-matrix IMM).

Figure 8:
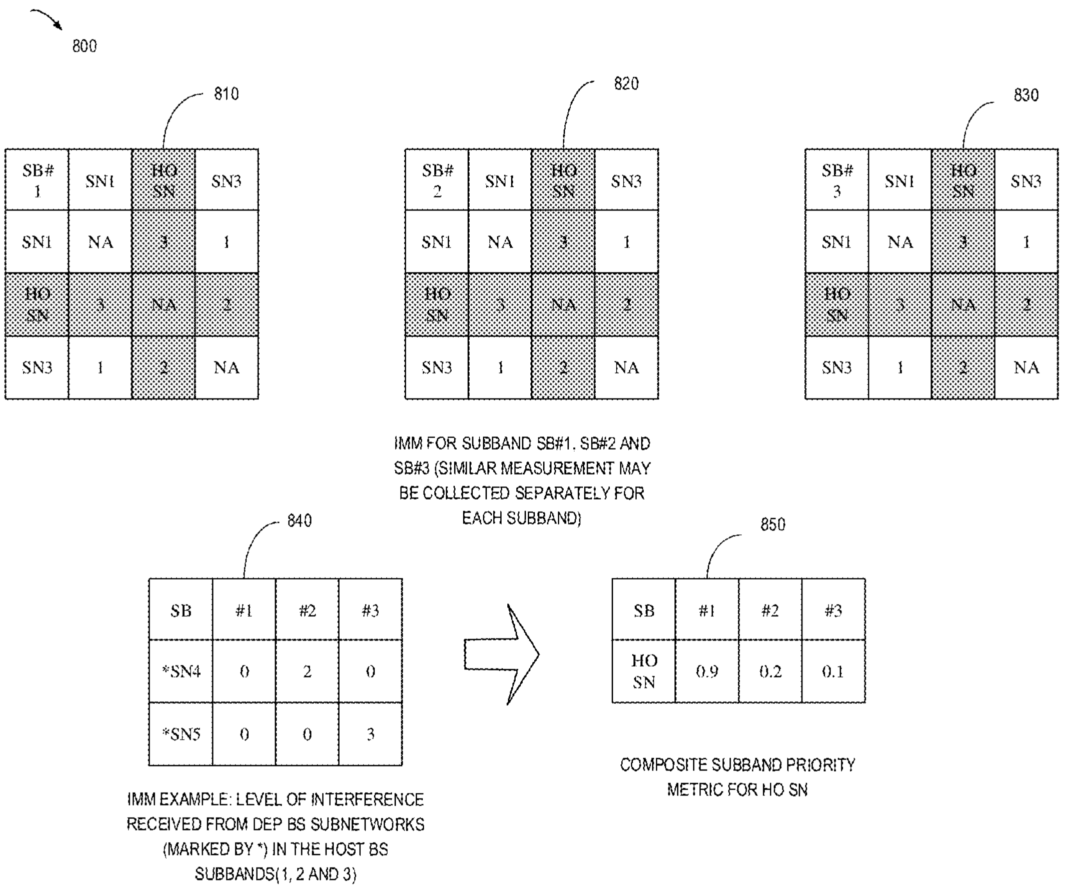
FIG. 8 illustrates an example block for determining allocated subband.

In some example embodiments, for the first apparatus 110, the IIMR is used along with IMM for subband assignment, e.g., the subbands where AP reports strong interference from departure BS cell are not considered (or de-prioritized) when choosing subband for it (refer to FIG. 8, which illustrates an example block 800 for determining allocated subband).

In FIG. 8, the subset of subnetworks chosen from the second apparatus 120 cell includes SN1 and SN3 and the subset of subbands chosen for this IMM measurement includes SB #1, SB #2 and SB #3. The IIMR includes interference from SN4 and SN5, which are subnetworks in the departure BS cell.

In FIG. 8, the interference levels in blocks 810, 820 and 830 are the first interference information, and the interference levels in block 840 are the second interference.

In FIG. 8, SN1 and SN3 are subnetworks in the second cell 170-2, and the SB #1, SB #2 and SB #3 are the measured subbands in the second cell 170-2. As can be seen from the block 810 in FIG. 8, the interference level between the HO SN (i.e., the first subnetwork) and SN1 on SB #1 is quantized to be '3', and the interference level between the HO SN (i.e., the first subnetwork) and SN3 on SB #1 is quantized to be '2'.

According to the block 820 in FIG. 8, the interference level between the HO SN (i.e., the first subnetwork) and SN1 on SB #2 is quantized to be '3', and the interference level between the HO SN (i.e., the first subnetwork) and SN3 on SB #2 is quantized to be '2'.

Further, according to the block 830 in FIG. 8, the interference level between the HO SN (i.e., the first subnetwork) and SN1 on SB #3 is quantized to be '3', and the interference level between the HO SN (i.e., the first subnetwork) and SN2 on SB #2 is quantized to be '2'.

In this event, if only considers the IMM measurements in the second cell 170-2, SB #1, SB #2 and SB #3 would be considered to have a same priority metric.

In FIG. 8, the *SN4 and *SN5 are subnetworks in the first cell 170-1, and the SB #1, SB #2 and SB #3 are the measured subbands in the first cell 170-1. According to the block 840 in FIG. 8,

- the interference level on SB #1 for SN*4 is quantized to be '0',
- the interference level on SB #1 for SN*5 is quantized to be '0',
- the interference level on SB #2 for SN*4 is quantized to be '2',
- the interference level on SB #2 for SN*5 is quantized to be '0',
- the interference level on SB #3 for SN*4 is quantized to be '0',
- the interference level on SB #3 for SN*5 is quantized to be '3'.

By considering both the first interference and the second interference, the priority metrics of the SB #1, SB #2 and SB #3 from high to low should be in an order of SB #1→SB #2→SB #3. As illustrated in block 850 of FIG. 8, as for the HO SN, the priority metric of SB #1 is quantized to be '0.9', the priority metric of SB #2 is quantized to be '0.2' and the priority metric of SB #3 is quantized to be '0.1', which means that SB #1 may be allocated to the HO SN.

Figure 2B:
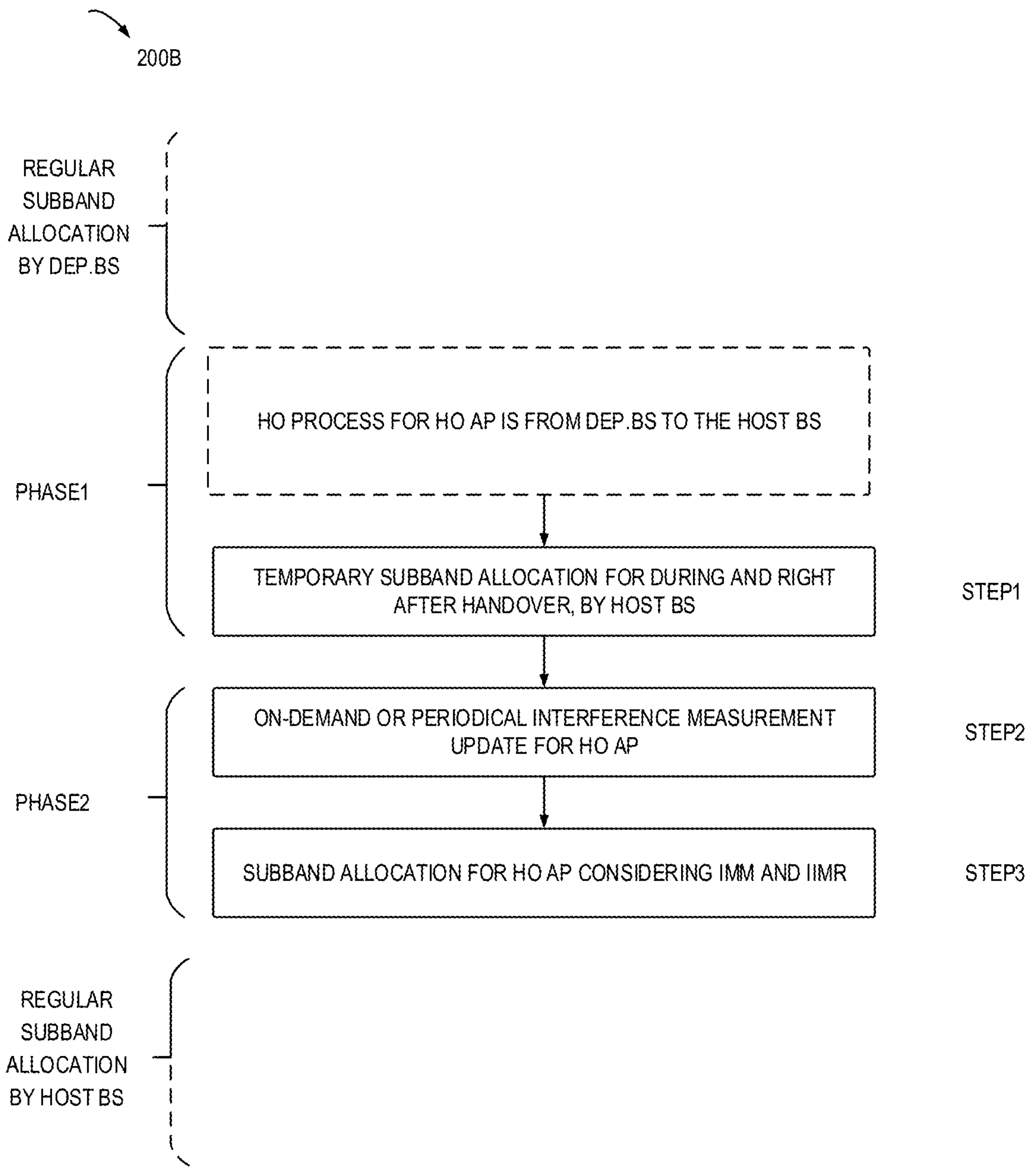
FIG. 2B illustrates example operation phase.

In some example embodiments, allocation procedure may be performed either for one resource allocation period, or continued to be used for multiple resource allocation periods, before switching to the 'Regular subband allocation by the second apparatus 120' phase in FIG. 2B. The number of cycles where the IIMR is used for subband allocation to the first apparatus 110 can be pre-configured based on subnetwork type (longer for slow-moving subnetwork such as in-body and shorter for fast moving subnetworks such as in-vehicle) or is determined dynamically by the second apparatus 120, e.g., based on mobility characteristics of the first apparatus 110 subnetwork.

Example Methods

Figure 9:
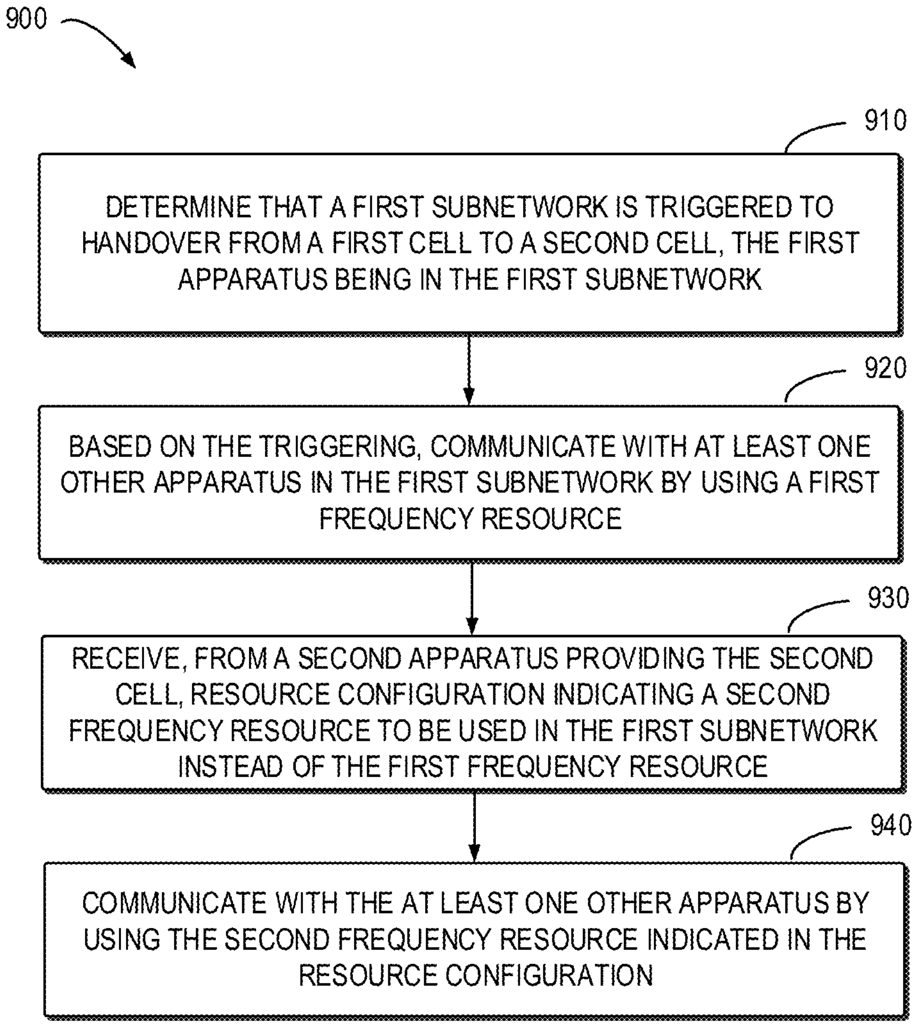
FIG. 9 illustrates a flowchart of a method implemented at a first apparatus according to some example embodiments of the present disclosure.

FIG. 9 shows a flowchart of an example method 900 implemented at a first device in accordance with some example embodiments of the present disclosure. For the purpose of discussion, the method 900 will be described from the perspective of the first apparatus 110 in FIG. 1.

At block 910, the first apparatus 110 determines that a first subnetwork 140 is triggered to handover from a first cell 170-1 to a second cell 170-2, the first apparatus 110 being in the first subnetwork 140.

At block 920, based on the triggering, the first apparatus 110 communicates with at least one other apparatus in the first subnetwork 140 by using a first frequency resource.

At block 930, the first apparatus 110 receives, from a second apparatus 120 providing the second cell 170-2, resource configuration indicating a second frequency resource to be used in the first subnetwork 140 instead of the first frequency resource.

At block 940, the first apparatus 110 communicates with the at least one other apparatus by using the second frequency resource indicated in the resource configuration.

In some example embodiments, the first apparatus 110 may receive, from a third apparatus 130 providing the first cell 170-1 or from the second apparatus 120, a first message indicating the first frequency resource; and may determine the first frequency resource based on the first message.

In some example embodiments, the first apparatus 110 may perform interference measurements on a plurality of frequency resources; and may determine, based on interference measurement results, the first frequency resource from the plurality of frequency resources.

In some example embodiments, the first apparatus 110 further comprises: prior to performing the interference measurements, the first apparatus 110 may receive, from a third apparatus 130 providing the first cell 170-1 or the second apparatus 120, a second message indicating the plurality of frequency resources.

In some example embodiments, second message further indicates a plurality of priority values corresponding to the plurality of frequency resources; the first apparatus 110 may determine the first frequency resource further based on the plurality of priority values.

In some example embodiments, the first apparatus 110 further comprises: prior to receiving the resource configuration, the first apparatus 110 may transmit, to the second apparatus 120, first interference information among the first subnetwork 140 and at least one second subnetwork 160 in the second cell 170-2.

In some example embodiments, the first apparatus 110 further comprises: prior to transmitting the first interference information, the first apparatus 110 may receive, from the second apparatus 120, a third message used for indicating the first apparatus 110 to perform interference measurements to determine the first interference information.

In some example embodiments, the first apparatus 110 further comprises: prior to receiving the resource configuration, the first apparatus 110 may transmit, to the second apparatus 120, second interference information among the first subnetwork 140 and at least one third subnetwork 150 in the first cell 170-1.

In some example embodiments, the first apparatus 110 further comprises: prior to transmitting the second interference information, the first apparatus 110 may receive, from the second apparatus 120 a fourth message used for configuring a resource to be used by the first apparatus 110 for transmitting the second interference information.

In some example embodiments, the first frequency resource may be a subband resource, and the second frequency resource may be a subband resource.

In some example embodiments, the first apparatus 110 may be an access point, the second and third apparatuses may be base stations.

Figure 10:
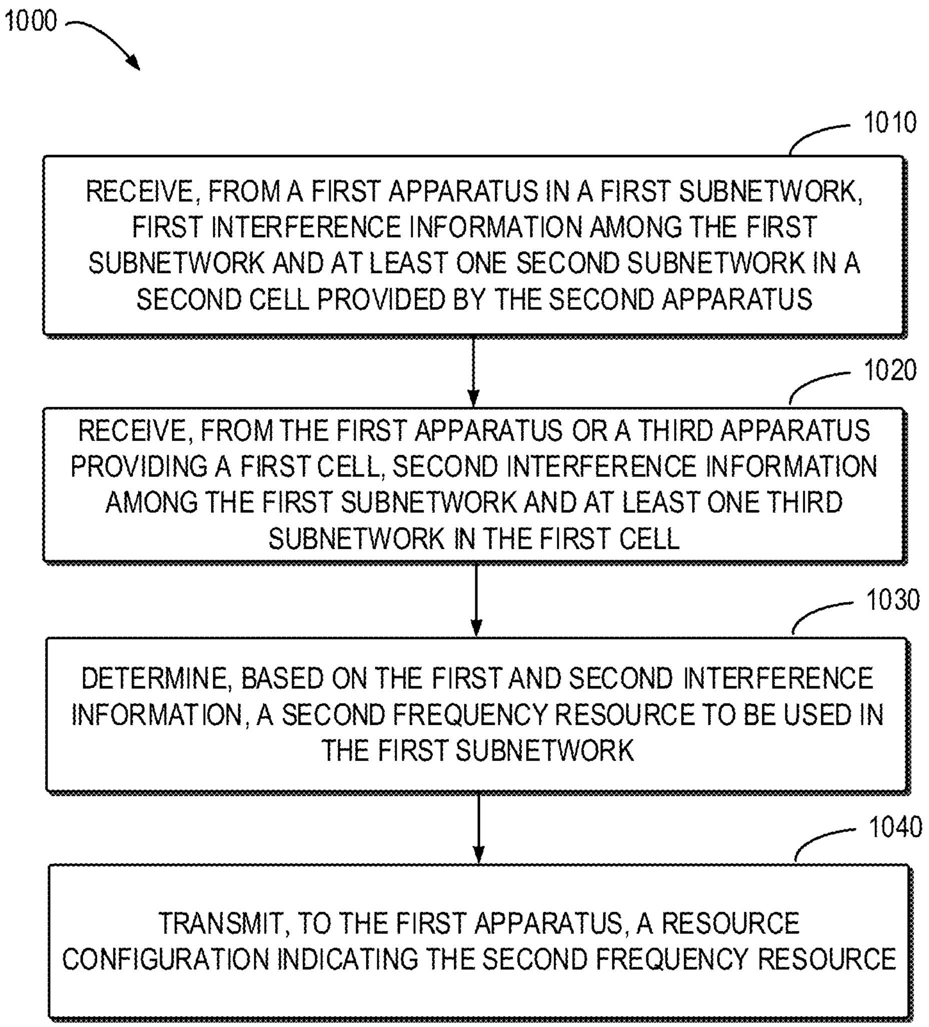
FIG. 10 illustrates a flowchart of a method implemented at a second apparatus according to some example embodiments of the present disclosure.

FIG. 10 shows a flowchart of an example method 1000 implemented at a second device in accordance with some example embodiments of the present disclosure. For the purpose of discussion, the method 1000 will be described from the perspective of the second apparatus 120 in FIG. 1.

At block 1010, the second apparatus 120 receives, from a first apparatus 110 in a first subnetwork 140, first interference information among the first subnetwork 140 and at least one second subnetwork 160 in a second cell 170-2 provided by the second apparatus 120.

At block 1020, the second apparatus 120 receives, from the first apparatus 110 or a third apparatus 130 providing a first cell 170-1, second interference information among the first subnetwork 140 and at least one third subnetwork 150 in the first cell 170-1.

At block 1030, the second apparatus 120 determines, based on the first and second interference information, a second frequency resource to be used in the first subnetwork 140.

At block 1040, the second apparatus 120 transmits, to the first apparatus 110, a resource configuration indicating the second frequency resource, the first subnetwork 140 is triggered to switch from the first frequency resource to the second frequency resource.

In some example embodiments, the second apparatus 120 further comprises: prior to transmitting the resource configuration, the second apparatus 120 may transmit, to the first apparatus 110 or to the third apparatus 130, a message comprising information of a plurality of frequency resources used by the first apparatus 110 to determine a first frequency resource, wherein the first frequency resource is useable in the first subnetwork 140 before the second frequency resource is obtained.

In some example embodiments, the message may further comprise a plurality of priority values corresponding to a plurality of frequency resources, wherein the plurality of priority values are used by the first apparatus 110 for determining the first frequency resource.

In some example embodiments, the second apparatus 120 further comprises: prior to receiving the first interference information, the second apparatus 120 may transmit, to the first apparatus 110, a third message used for indicating the first apparatus 110 to perform interference measurements to determine the first interference information.

In some example embodiments, the second apparatus 120 further comprises: prior to receiving the second interference information, the second apparatus 120 may transmit, to the first apparatus 110, a fourth message used for configuring a resource to be used by the first apparatus 110 for transmitting the second interference information.

In some example embodiments, the second frequency resource may be a subband resource.

In some example embodiments, the first apparatus 110 may be an access point, the second and third apparatuses may be base stations.

Figure 11:
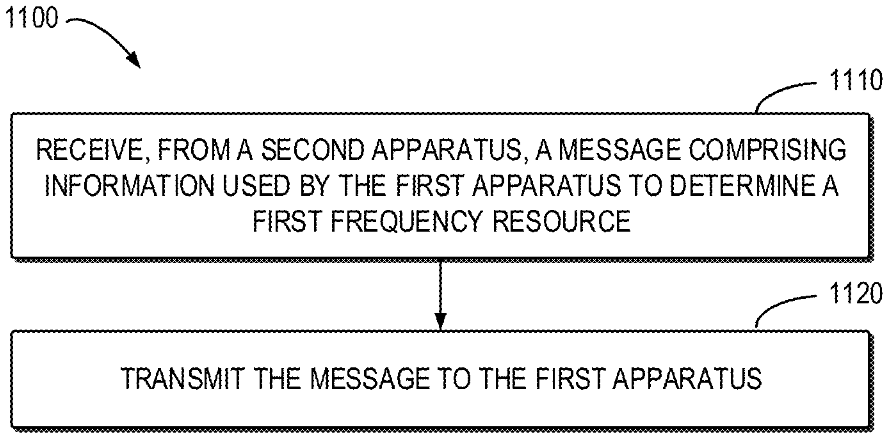
FIG. 11 illustrates a flowchart of a method implemented at a third apparatus according to some example embodiments of the present disclosure.

FIG. 11 shows a flowchart of an example method 1100 implemented at a third device in accordance with some example embodiments of the present disclosure. For the purpose of discussion, the method 1100 will be described from the perspective of the third apparatus 130 in FIG. 1.

At block 1110, the third apparatus 130 receives, from a second apparatus 120, a message comprising information used by the first apparatus 110 to determine a first frequency resource.

At block 1120, the third apparatus 130 transmits the message to the first apparatus 110, the first subnetwork 140 is triggered to switch from a first cell 170-1 provided by the third apparatus 130 to a second cell 170-2 provided by the second apparatus 120.

In some example embodiments, the third apparatus 130 may transmit, to the second apparatus 120, second interference information among the first subnetwork 140 and at least one third subnetwork 150 in the first cell 170-1.

In some example embodiments, the first frequency resource may be a subband resource.

In some example embodiments, the first apparatus 110 may be an access point, the second and third apparatuses may be base stations.

Example Apparatus, Device and Medium

In some example embodiments, a first apparatus capable of performing any of the method 900 (for example, the first apparatus 110 in FIG. 1) may comprise means for performing the respective operations of the method 900. The means may be implemented in any suitable form. For example, the means may be implemented in a circuitry or software module. The first apparatus may be implemented as or included in the first apparatus 110 in FIG. 1.

In some example embodiments, the first apparatus comprises means for determining that a first subnetwork is triggered to handover from a first cell to a second cell, the first apparatus being in the first subnetwork; means for based on the triggering, communicating with at least one other apparatus in the first subnetwork by using a first frequency resource; means for receiving, from a second apparatus providing the second cell, resource configuration indicating a second frequency resource to be used in the first subnetwork instead of the first frequency resource; and means for communicating with the at least one other apparatus by using the second frequency resource indicated in the resource configuration.

In some example embodiments, the first apparatus further comprises: means for receiving, from a third apparatus providing the first cell or from the second apparatus, a first message indicating the first frequency resource; and means for determining the first frequency resource based on the first message.

In some example embodiments, the first apparatus further comprises: means for performing interference measurements on a plurality of frequency resources; and means for determining, based on interference measurement results, the first frequency resource from the plurality of frequency resources.

In some example embodiments, the first apparatus further comprises: means for prior to performing the interference measurements, receiving, from a third apparatus providing the first cell or the second apparatus, a second message indicating the plurality of frequency resources.

In some example embodiments, second message further indicates a plurality of priority values corresponding to the plurality of frequency resources; means for determining the first frequency resource further based on the plurality of priority values.

In some example embodiments, the first apparatus further comprises: means for prior to receiving the resource configuration, transmitting, to the second apparatus, first interference information among the first subnetwork and at least one second subnetwork in the second cell.

In some example embodiments, the first apparatus further comprises: means for prior to transmitting the first interference information, receiving, from the second apparatus, a third message used for indicating the first apparatus to perform interference measurements to determine the first interference information.

In some example embodiments, the first apparatus further comprises: means for prior to receiving the resource configuration, transmitting, to the second apparatus, second interference information among the first subnetwork and at least one third subnetwork in the first cell.

In some example embodiments, the first apparatus further comprises: means for prior to transmitting the second interference information, receiving, from the second apparatus a fourth message used for configuring a resource to be used by the first apparatus for transmitting the second interference information.

In some example embodiments, the first frequency resource is a subband resource, and the second frequency resource is a subband resource.

In some example embodiments, the first apparatus is an access point, the second and third apparatuses are base stations.

In some example embodiments, the first apparatus further comprises means for performing other operations in some example embodiments of the method 900 or the first apparatus 110. In some example embodiments, the means comprises at least one processor; and at least one memory storing instructions that, when executed by the at least one processor, cause the performance of the first apparatus.

In some example embodiments, a second apparatus capable of performing any of the method 1000 (for example, the second apparatus 120 in FIG. 1) may comprise means for performing the respective operations of the method 1000. The means may be implemented in any suitable form. For example, the means may be implemented in a circuitry or software module. The second apparatus may be implemented as or included in the second apparatus 120 in FIG. 1.

In some example embodiments, the second apparatus comprises means for receiving, from a first apparatus in a first subnetwork, first interference information among the first subnetwork and at least one second subnetwork in a second cell provided by the second apparatus; means for receiving, from the first apparatus or a third apparatus providing a first cell, second interference information among the first subnetwork and at least one third subnetwork in the first cell; means for determining, based on the first and second interference information, a second frequency resource to be used in the first subnetwork; and means for transmitting, to the first apparatus, a resource configuration indicating the second frequency resource, wherein the first subnetwork is triggered to switch from the first cell to the second cell.

In some example embodiments, the second apparatus further comprises: means for prior to transmitting the resource configuration, transmit, to the first apparatus or to the third apparatus, a message comprising information used by the first apparatus to determine a first frequency resource, wherein the first frequency resource is useable in the first subnetwork before the second frequency resource is obtained.

In some example embodiments, the message further comprises a plurality of priority values corresponding to a plurality of frequency resources, wherein the plurality of priority values are used by the first apparatus for determining the first frequency resource.

In some example embodiments, the second apparatus further comprises: means for prior to receiving the first interference information, transmitting, to the first apparatus, a third message used for indicating the first apparatus to perform interference measurements to determine the first interference information.

In some example embodiments, the second apparatus further comprises: means for prior to receiving the second interference information, transmitting, to the first apparatus, a fourth message used for configuring a resource to be used by the first apparatus for transmitting the second interference information.

In some example embodiments, the second frequency resource is a subband resource.

In some example embodiments, the first apparatus is an access point, the second and third apparatuses are base stations.

In some example embodiments, the second apparatus further comprises means for performing other operations in some example embodiments of the method 1000 or the second apparatus 120. In some example embodiments, the means comprises at least one processor; and at least one memory storing instructions that, when executed by the at least one processor, cause the performance of the second apparatus.

In some example embodiments, a third apparatus capable of performing any of the method 1100 (for example, the third apparatus 130 in FIG. 1 may comprise means for performing the respective operations of the method 1100. The means may be implemented in any suitable form. For example, the means may be implemented in a circuitry or software module. The third apparatus may be implemented as or included in the third apparatus 130 in FIG. 1.

In some example embodiments, the third apparatus comprises means for receiving, from a second apparatus, a message comprising information used by the first apparatus to determine a first frequency resource; and means for transmitting the message to the first apparatus, wherein the first subnetwork is triggered to switch from a first cell provided by the third apparatus to a second cell provided by the second apparatus.

In some example embodiments, the third apparatus further comprises: means for transmitting, to the second apparatus, second interference information among the first subnetwork and at least one third subnetwork in the first cell.

In some example embodiments, the first frequency resource is a subband resource.

In some example embodiments, the first apparatus is an access point, the second and third apparatuses are base stations.

In some example embodiments, the third apparatus further comprises means for performing other operations in some example embodiments of the method 1100 or the third apparatus 130. In some example embodiments, the means comprises at least one processor; and at least one memory storing instructions that, when executed by the at least one processor, cause the performance of the third apparatus.

Figure 12:
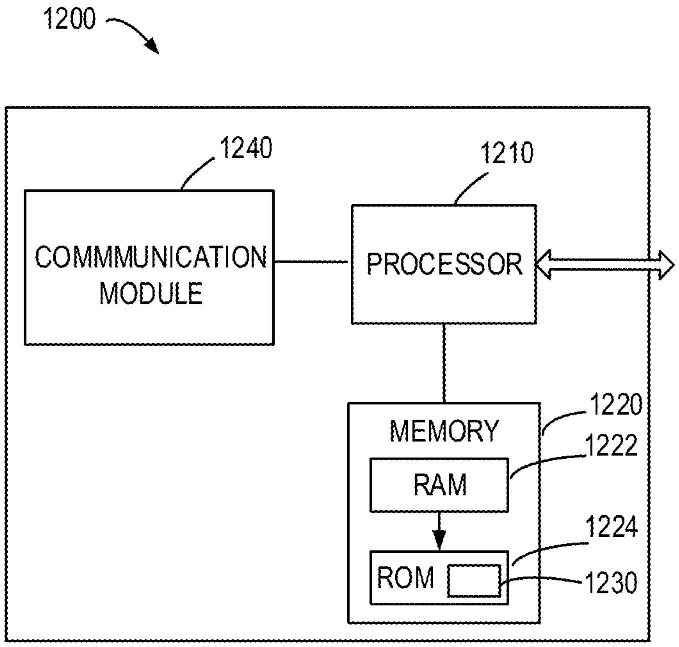
FIG. 12 illustrates a simplified block diagram of a device that is suitable for implementing example embodiments of the present disclosure.

FIG. 12 is a simplified block diagram of a device 1200 that is suitable for implementing example embodiments of the present disclosure. The device 1200 may be provided to implement a communication device, for example, the first apparatus 110, the second apparatus 120, or the third apparatus 130 as shown in FIG. 1. As shown, the device 1200 includes one or more processors 1210, one or more memories 1220 coupled to the processor 1210, and one or more communication modules 1240 coupled to the processor 1210.

The communication module 1240 is for bidirectional communications. The communication module 1240 has one or more communication interfaces to facilitate communication with one or more other modules or devices. The communication interfaces may represent any interface that is necessary for communication with other network elements. In some example embodiments, the communication module 1240 may include at least one antenna.

The processor 1210 may be of any type suitable to the local technical network and may include one or more of the following: general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

The memory 1220 may include one or more non-volatile memories and one or more volatile memories. Examples of the non-volatile memories include, but are not limited to, a Read Only Memory (ROM) 1224, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 1222 and other volatile memories that will not last in the power-down duration.

A computer program 1230 includes computer executable instructions that are executed by the associated processor 1210. The instructions of the program 1230 may include instructions for performing operations/acts of some example embodiments of the present disclosure. The program 1230 may be stored in the memory, e.g., the ROM 1224. The processor 1210 may perform any suitable actions and processing by loading the program 1230 into the RAM 1222.

The example embodiments of the present disclosure may be implemented by means of the program 1230 so that the device 1200 may perform any process of the disclosure as discussed with reference to FIG. 2 to FIG. 11. The example embodiments of the present disclosure may also be implemented by hardware or by a combination of software and hardware.

In some example embodiments, the program 1230 may be tangibly contained in a computer readable medium which may be included in the device 1200 (such as in the memory 1220) or other storage devices that are accessible by the device 1200. The device 1200 may load the program 1230 from the computer readable medium to the RAM 1222 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 13:
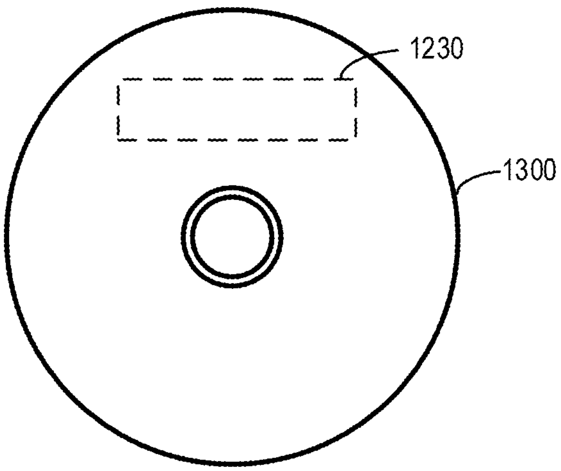
FIG. 13 illustrates a block diagram of an example computer readable medium in accordance with some example embodiments of the present disclosure.

FIG. 13 shows an example of the computer readable medium 1300 which may be in form of CD, DVD or other optical storage disk. The computer readable medium 1300 has the program 1230 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus comprising:

at least one processor; and at least one memory storing instructions that, when executed by the at least one processor, cause the first apparatus at least to:

determine that a first subnetwork is triggered to handover from a first cell to a second cell, the first apparatus being in the first subnetwork;

receive, from a second apparatus providing the first cell, a first message indicating a plurality of frequency resources and a plurality of priority values corresponding to the plurality of frequency resources;

perform interference measurements on the plurality of frequency resources; and determine, based on interference measurement results, the plurality of priority values, and an interference measurement matrix (IMM), a first frequency resource from the plurality of frequency resources, the first frequency resource being a subband resource, wherein the IMM denotes a holistic inter-subnetwork interference measure which is constructed by the second apparatus based on inter-subnetwork interference periodically reported from all relevant sub-network access points (APs), wherein the inter-subnetwork interference reported from the subnetwork APs are a summed weighted interference-to-signal power ratio measured by the subnetwork APs for an interference from each interfering subnetwork, and wherein subbands where APs report strong interference from the first cell are not considered when choosing the first frequency resource;

based on the triggering, communicate with at least one other apparatus in the first subnetwork by using the first frequency resource;

receive, from the second apparatus providing the second cell, resource configuration indicating a second frequency resource to be used in the first subnetwork instead of the first frequency resource, the second frequency resource being a subband resource; and communicate with the at least one other apparatus by using the second frequency resource indicated in the resource configuration.

2. The first apparatus of claim 1, wherein an instantaneous carrier sensing result from the first apparatus is used in form of weighting values.

3. The first apparatus of claim 2, wherein the first apparatus is further caused to:

prior to receiving the resource configuration, transmit, to the second apparatus, first interference information among the first subnetwork and at least one second subnetwork in the second cell.

4. The first apparatus of claim 3, wherein the first apparatus is further caused to:

prior to transmitting the first interference information, receive, from the second apparatus, a third message used for indicating the first apparatus to perform interference measurements to determine the first interference information.

5. The first apparatus of claim 4, wherein the first apparatus is further caused to:

prior to receiving the resource configuration, transmit, to the second apparatus, second interference information among the first subnetwork and at least one third subnetwork in the first cell.

6. The first apparatus of claim 5, wherein the first apparatus is further caused to:

prior to transmitting the second interference information, receive, from the second apparatus a fourth message used for configuring a resource to be used by the first apparatus for transmitting the second interference information.

7. The first apparatus of claim 6, wherein the first apparatus is an access point, the second apparatus is a base station.

8. A system comprising:

a first apparatus;

at least one processor; and at least one memory storing instructions that, when executed by the at least one processor, cause the first apparatus at least to:

determine that a first subnetwork is triggered to handover from a first cell to a second cell, the first apparatus being in the first subnetwork;

receive, from a second apparatus providing the first cell, a first message indicating a plurality of frequency resources and a plurality of priority values corresponding to the plurality of frequency resources;

perform interference measurements on the plurality of frequency resources; and determine, based on interference measurement results, the plurality of priority values, and an interference measurement matrix (IMM), a first frequency resource from the plurality of frequency resources, the first frequency resource being a subband resource, wherein the IMM denotes a holistic inter-subnetwork interference measure which is constructed by the second apparatus based on inter-subnetwork interference periodically reported from all relevant sub-network access points (APs), wherein the inter-subnetwork interference reported from the subnetwork APs are a summed weighted interference-to-signal power ratio measured by the subnetwork APs for an interference from each interfering subnetwork, and wherein subbands where APs report strong interference from the first cell are not considered when choosing the first frequency resource;

based on the triggering, communicate with at least one other apparatus in the first subnetwork by using the first frequency resource;

receive, from the second apparatus providing the second cell, resource configuration indicating a second frequency resource to be used in the first subnetwork instead of the first frequency resource, the second frequency resource being a subband resource; and communicate with the at least one other apparatus by using the second frequency resource indicated in the resource configuration.

9. The system of claim 8, wherein an instantaneous carrier sensing result from the first apparatus is used in form of weighting values.

10. The system of claim 9, wherein the first apparatus is further caused to:

prior to receiving the resource configuration, transmit, to the second apparatus, first interference information among the first subnetwork and at least one second subnetwork in the second cell.

11. The system of claim 10, wherein the first apparatus is further caused to:

prior to transmitting the first interference information, receive, from the second apparatus, a third message used for indicating the first apparatus to perform interference measurements to determine the first interference information.

12. The system of claim 11, wherein the first apparatus is further caused to:

prior to receiving the resource configuration, transmit, to the second apparatus, second interference information among the first subnetwork and at least one third subnetwork in the first cell.

13. The system of claim 12, wherein the first apparatus is further caused to:

prior to transmitting the second interference information, receive, from the second apparatus a fourth message used for configuring a resource to be used by the first apparatus for transmitting the second interference information.

14. The system of claim 13, wherein the first apparatus is an access point, the second apparatus is a base station.

15. A method comprising:

determining, by a first apparatus, that a first subnetwork is triggered to handover from a first cell to a second cell, the first apparatus being in the first subnetwork;

receiving, from a second apparatus providing the first cell, a first message indicating a plurality of frequency resources and a plurality of priority values corresponding to the plurality of frequency resources;

performing interference measurements on the plurality of frequency resources; and determining, based on interference measurement results, the plurality of priority values, and an interference measurement matrix (IMM), a first frequency resource from the plurality of frequency resources, the first frequency resource being a subband resource, wherein the IMM denotes a holistic inter-subnetwork interference measure which is constructed by the second apparatus based on inter-subnetwork interference periodically reported from all relevant sub-network access points (APs), wherein the inter-subnetwork interference reported from the subnetwork APs are a summed weighted interference-to-signal power ratio measured by the subnetwork APs for an interference from each interfering subnetwork, and wherein subbands where APs report strong interference from the first cell are not considered when choosing the first frequency resource;

based on the triggering, communicating with at least one other apparatus in the first subnetwork by using the first frequency resource;

receiving, from the second apparatus providing the second cell, resource configuration indicating a second frequency resource to be used in the first subnetwork instead of the first frequency resource, the second frequency resource being a subband resource; and communicating with the at least one other apparatus by using the second frequency resource indicated in the resource configuration.

16. The method of claim 15, wherein an instantaneous carrier sensing result from the first apparatus is used in form of weighting values.

17. The method of claim 9, further comprising:

prior to receiving the resource configuration, transmitting, to the second apparatus, first interference information among the first subnetwork and at least one second subnetwork in the second cell.

18. The method of claim 17, further comprising:

prior to transmitting the first interference information, receiving, from the second apparatus, a third message used for indicating the first apparatus to perform interference measurements to determine the first interference information.

19. The method of claim 18, further comprising:

prior to receiving the resource configuration, transmit, to the second apparatus, second interference information among the first subnetwork and at least one third subnetwork in the first cell.

20. The method of claim 19, further comprising:

prior to transmitting the second interference information, receiving, from the second apparatus a fourth message used for configuring a resource to be used by the first apparatus for transmitting the second interference information.

* * * * *